(12) United States Patent
Ishikawa

(10) Patent No.: US 7,415,000 B2
(45) Date of Patent: Aug. 19, 2008

(54) DATA TRANSMISSION APPARATUS AND DATA TRANSMISSION METHOD

(75) Inventor: Kimihiko Ishikawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1213 days.

(21) Appl. No.: 10/380,506

(22) PCT Filed: Jul. 18, 2002

(86) PCT No.: PCT/JP02/07286

§ 371 (c)(1),
(2), (4) Date: Mar. 14, 2003

(87) PCT Pub. No.: WO03/009503

PCT Pub. Date: Jan. 30, 2003

(65) Prior Publication Data

US 2004/0042431 A1 Mar. 4, 2004

(30) Foreign Application Priority Data

Jul. 18, 2001 (JP) .............................. 2001-218717

(51) Int. Cl.
*H04J 3/00* (2006.01)
(52) U.S. Cl. ...................... 370/345; 370/350; 370/503; 455/13.2; 455/502
(58) Field of Classification Search ................ 370/345, 370/350, 252, 503, 506, 508; 455/13.2, 502, 455/208, 265, 324
See application file for complete search history.

(56) References Cited

U.S. PATENT DOCUMENTS 5,392,421 A * 2/1995 Lennartsson ................ 713/400
5,987,023 A * 11/1999 Albrow et al. ............... 370/350
6,988,236 B2 * 1/2006 Ptasinski et al. ............. 370/252
7,000,031 B2 * 2/2006 Fischer et al. ................ 370/503
2002/0093940 A1 * 7/2002 Toskala et al. ............... 370/350
2003/0002537 A1 * 1/2003 Schaller ...................... 370/345

FOREIGN PATENT DOCUMENTS

| JP | 02241140 | 9/1990 |
|---|---|---|
| JP | 6503219 | 4/1994 |
| JP | 07283773 | 10/1995 |
| JP | 09148943 | 6/1997 |
| JP | 11275038 | 10/1999 |
| JP | 2000013867 | 1/2000 |
| JP | 2001054162 | 2/2001 |
| JP | 2001358638 | 12/2001 |

OTHER PUBLICATIONS

International Search Report dated Oct. 15, 2002.

* cited by examiner

*Primary Examiner*—Jean Gelin
*Assistant Examiner*—Huy D Nguyen
(74) *Attorney, Agent, or Firm*—Stevens, Davis, Miller & Mosher, LLP

(57) ABSTRACT

In base station 100, TA control amount calculating section 106 calculates a time alignment control amount based on a signal received from communication terminal station 150. Then, TA control amount rounding section 107 performs rounding on the time alignment control amount to obtain a time aliment control amount of the predetermined number of significant digits and a rounding error amount. Reception timing correcting section 109 corrects the reception timing detected in reception timing detecting section 103, using the rounding error amount. Receiving section 104 obtains demodulated data from a received signal at the corrected reception timing.

8 Claims, 3 Drawing Sheets

DATA TRANSMISSION APPARATUS AND DATA TRANSMISSION METHOD

TECHNICAL FIELD

The present invention relates to a data transmission apparatus, for example, in a TDMA (Time Division Multiple Access) communication system, and more particularly, to a data transmission apparatus that performs time alignment control.

BACKGROUND ART

Conventionally, there are communication systems using time alignment (TA) as a method of controlling the transmission timing in communication terminal stations. Herein, the reason is explained for introducing time alignment to a communication system where TDMA communications are performed, as an example.

A base station that performs TDMA communications receives time slots on which respective channel signals of communication terminal stations are multiplexed through transmission paths. The base station specifies a slot position of each of the communication terminal stations, using a preamble signal added to a data signal of each of the communication terminal stations.

However, when specifying a slot position using a preamble signal, there is such a problem that uplink reception performance is greatly affected by accuracy in detecting slot positions. In other words, an error in the specified slot position degrades the reception performance. Particularly, when a slot position cannot be detected, it is not possible to fetch the data of the slot at all.

Further, when a distance between the base station and a communication terminal station that transmits channel signals is large, a delay (hereinafter referred to as "propagation delay") occurs until the channel signals reach the base station, and burst signals may collide.

Therefore, the base station detects propagation delays for each channel, and using the detected propagation delays, controls transmission timings in communication terminal stations, thus performing time alignment control. In other words, the base station sets transmission timings for each of the communication terminal stations based on the detected propagation delays for each of the communication terminal stations, and broadcasts set respective transmission timings to the terminal stations as a time alignment control amount, and each of the terminal stations transmits signals according to the time alignment control amount broadcast from the base station. According to such time alignment control, the base station is capable of suppressing amounts of departure from reception timings caused by different distances between the base station and the communication terminal stations and of preventing burst signals from colliding with one another, and thereby the reception quality is improved. Further, since each of the communication terminal stations adjusts the transmission timing according to the time alignment control amount, the base station is capable of predicting the reception timing from the time alignment control amount. Accordingly, even when the base station fails to detect a slot position, the station is capable of receiving the slot.

However, in the aforementioned time alignment control, since a base station needs to broadcast time alignment control amounts to communication terminal stations, there arise problems that a ratio of data transmission burst to a frame decreases and that the frame utility efficiency deteriorates.

DISCLOSURE OF INVENTION

In view of the foregoing, it is an object of the present invention to provide a data transmission apparatus such as a base station and data transmission method enabling enhanced data transmission efficiency without degrading accuracy in reception timing generation.

The object is achieved by in a data transmission apparatus, in reception timing generation, performing time alignment control using a time alignment control amount expressed by the predetermined number of significant digits in rounding, while correcting the reception timing using a rounding error amount in the rounding.

In other words, in making the present invention, the inventor of the present invention noted a rounding error amount caused by rounding of the time alignment control amount. In the conventional rounding, since the data transmission efficiency deteriorates in the system when a calculated time alignment control amount is transmitted without being processed, the calculated time alignment control amount is expressed by the predetermined number of significant digits, and digits to the right of the significant digits are abandoned as a rounding error amount, thereby reducing an information amount of the time alignment control amount. The inventor of the present invention found out that using the rounding error amount as significant information to correct reception timing, the accuracy in reception timing generation is improved in the data transmission apparatus, and thus reached the present invention.

BEST MODE FOR CARRYING OUT THE INVENTION

Embodiments of the present invention will be described specifically below with reference to accompanying drawings.

FIRST EMBODIMENT

Figure 1:
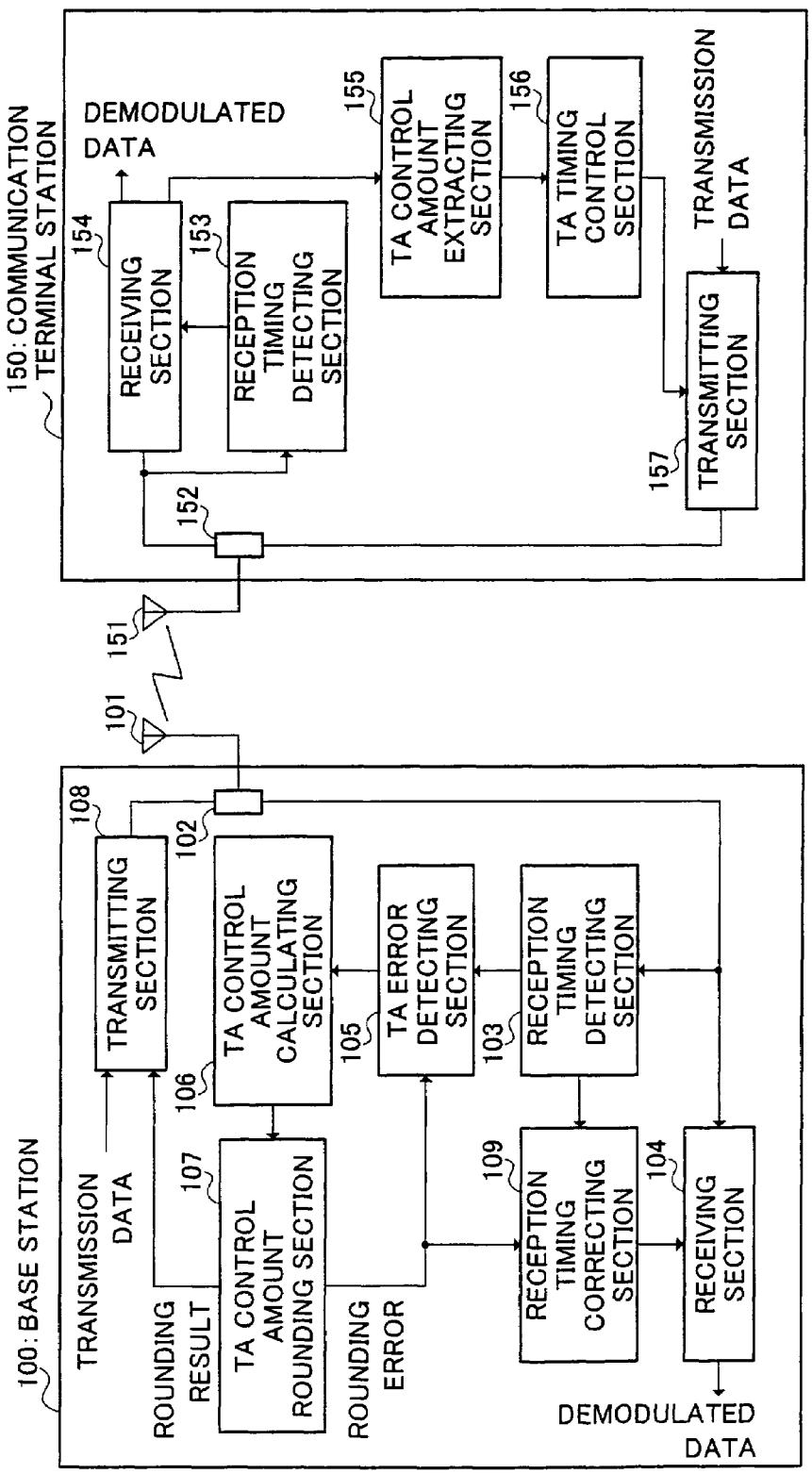
FIG. 1 is a diagram illustrating a configuration of a TDMA communication system according to a first embodiment of the present invention.

FIG. 1 is diagram illustrating a configuration of a TDMA communication system according to the first embodiment of the present invention. The communication system illustrated in FIG. 1 includes base station 100 that is a data transmission apparatus and communication terminal station 150. Herein, to simplify the explanation, only communication terminal station 150 is illustrated as a communicating party of base station 100, but in an actual system, base station 100 communicates with a plurality of communication terminal stations.

In FIG. 1, a burst transmitted from communication terminal station 150 is received in antenna 101 in base station 100. The received burst received in antenna 101 is output to reception timing detecting section 103 and receiving section 104 through duplexer 102.

Reception timing detecting section 103 detects the reception timing using a preamble signal contained in the received burst. Reception timing correcting section 109 corrects the reception timing detected in reception timing detecting section 103, based on a rounding error amount output from TA control amount rounding section 107 described later. In other words, reception timing correcting section 109 delays the reception timing by a timing adjustment amount indicated by the rounding error amount. Receiving section 104 demodulates a data signal contained in the received burst at the reception timing corrected in reception timing correcting section 109, and obtains demodulated data.

TA error detecting section 105 detects an error between the reception timing detected in reception timing detecting section 103 and known reference timing. Based on the error between the reception timing and the reference timing detected in TA error detecting section 105, TA control amount calculating section 106 calculates a time alignment control amount (herein after referred to as "TA control amount") indicative of an adjustment amount of transmission timing in communication terminal station 105, and outputs the calculated TA control amount to TA control amount rounding section 107.

TA control amount rounding section 107 performs rounding on the TA control amount calculated in TA control amount calculating section 106, expresses the TA control amount by the predetermined number of significant digits, and outputs the TA control amount expressed by the predetermined number of significant digits to transmitting section 108. Further, TA control amount rounding section 107 outputs a rounding error amount caused by the rounding (i.e., an amount expressed by digits to the right of the significant digits) to reception timing correcting section 109.

For example, when the TA control amount calculated in TA control amount calculating section 106 is "123". . . and the number of significant digits in rounding is one, "100" is transmitted to communication terminal station 150, and "23" is used in correcting the reception timing in reception timing correcting section 109.

Transmitting section 108 modulates the rounding-processed TA control amount (i.e., TA control amount expressed by the number of significant digits) and transmission data according to a predetermined modulation scheme to generate a transmission burst, and transmits radio signals of the burst at the predetermined transmission timing from antenna 101 through duplexer 102.

The burst transmitted from base station 101 is received in antenna 151 in communication terminal station 150. The received burst received in antenna 151 is output to reception timing detecting section 153 and receiving section 154 through duplexer 152. Reception timing detecting section 153 detects the reception timing using a preamble signal contained in the received burst. Receiving section 154 demodulates the received burst at the reception timing detected in reception timing detecting section 153, and obtains demodulated data. The demodulated data is subjected to decoding in sections (not shown) subsequent to receiving section 154, while being output to TA control amount extracting section 155.

TA control amount extracting section 155 extracts the TA control amount (rounding-processed TA control amount) from the demodulated data, and outputs the extracted TA control amount to TA timing control section 156. TA timing control section 156 controls the transmission timing according to the TA control amount extracted in TA control amount extracting section 155. In other words, TA timing control section 156 controls the transmission timing to be earlier by an adjustment amount of transmission timing indicated by the extracted TA control amount.

Transmitting section 157 performs predetermined modulation on transmission data to generate a burst, and outputs the generated burst to duplexer 152 at the transmission timing according to the control of TA timing control section 156. Radio signals of the burst output from transmitting section 157 are transmitted from antenna 151 through duplexer 152.

The operation of the communication system with the above configuration will be described below.

An uplink burst transmitted from communication terminal station 150 is received in antenna 101 in base station 100. The received burst is output to reception timing detecting section 103 through duplexer 102, and reception timing detecting section 103 detects the reception timing. Reception timing correcting section 109 corrects the reception timing, using a rounding error amount obtained in TA control amount rounding section 107. In other words, the rounding-processed TA control amount is transmitted to communication terminal station 150, and based on the rounding-processed TA control amount, communication terminal station 150 adjusts the transmission timing. Accordingly, it is considered that the accuracy in transmission timing adjustment deteriorates corresponding to a TA control amount (i.e., rounding error amount) deleted in the rounding. Then, reception timing correcting section 109 corrects the reception timing that communication terminal station 150 cannot adjust, using the rounding error amount obtained in TA control amount rounding section 107. Receiving section 104 demodulates the received burst at the corrected reception timing, and obtains the demodulated data.

Meanwhile, TA error detecting section 105 detects an error between the reception timing and reference timing, and based on the error, TA control amount calculating section 106 calculates a TA control amount. TA control amount rounding section 107 performs rounding on the TA control amount, and obtains a TA control amount expressed by the predetermined number of significant digits. The TA control amount (rounding-processed TA control amount) expressed by the predetermined number of significant digits is output to transmitting section 108, and a TA control amount (rounding error amount) of digits to the right of the significant digits is output to reception timing correcting section 109. The rounding-processed TA control amount is subjected to the predetermined modulation in transmitting section 108, and resultant radio signals are transmitted from antenna 101 at the predetermined transmission timing.

Radio signals of a downlink burst transmitted from antenna 101 is received in antenna 151 in communication terminal station 150. The received burst is output to reception timing detecting section 153 and receiving section 154 through duplexer 152. Receiving section 154 demodulates the received burst at the reception timing detected in reception timing detecting section 153, and obtains the demodulated data. The demodulated data is used in subsequent processing such as decoding, while being output to TA control amount extracting section 155.

TA control amount extracting section 155 extracts the TA control amount form the demodulated data. According to the extracted TA control amount, TA timing control section 156 controls the transmission timing in transmitting section 157. Transmitting section 157 modulates the transmission data according to a predetermined modulation scheme to generate a burst, and outputs the generated burst at the timing earlier than the predetermined transmission timing by an adjustment amount indicated by the TA control amount, according to the control of TA timing control section 156. Radio signals of the burst are transmitted from antenna 151 through duplexer 152.

In this way, since a burst transmitted from communication terminal station 150 is transmitted at the timing earlier than the transmission timing specific to each communication terminal station by the TA control amount, the burst transmitted from communication terminal station 150 is prevented from colliding with bursts transmitted from other communication terminal stations.

Figure 2:
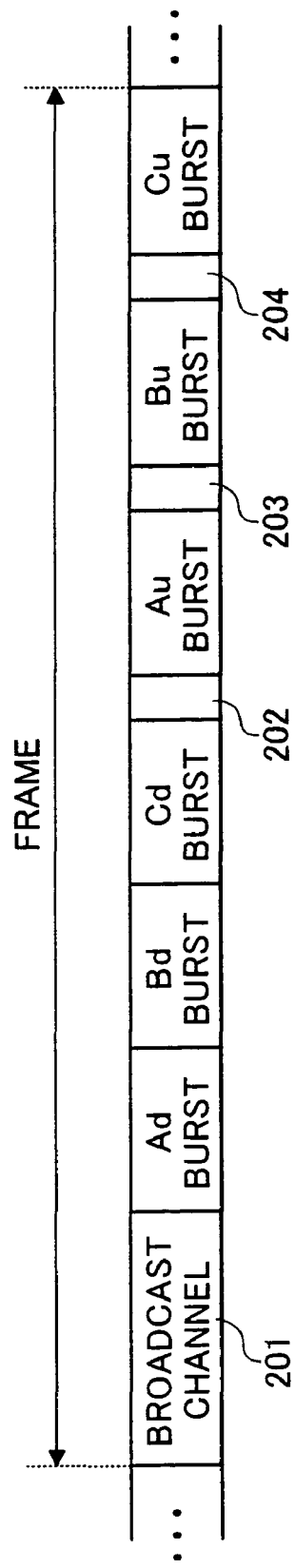
FIG. 2 is a diagram illustrating a configuration of a channel for communications.

FIG. 2 is a diagram illustrating a configuration of a channel for communications. As an example of TDMA communication channel, FIG. 2 illustrates a communication channel in the case where three communication terminal stations (assumed to be communication terminals A, B and C) communicate with a base station. In other words, the communication channel shown in FIG. 2 is comprised of broadcast channel 201 used in broadcasting control information such as TA control amount to communication terminal stations and three-channel-data transmission channel. In the communication channel, the broadcast channel is configured at the beginning of each frame and is followed by downlink bursts Ad to Cd respectively to communication terminal stations A to C, and the downlink bursts are followed by uplink bursts Au to Cu transmitted respectively from communication terminal stations A to C. In addition, while FIG. 2 illustrates the communication channel provided with three data transmission channels, it may be possible to provide an arbitrary number of data transmission channels corresponding to the system setting.

Further, between uplink bursts are provided guard intervals 202 to 204 to prevent adjacent bursts from colliding with one another. The duration of the guard interval is determined beforehand in the system in consideration of factors such as a distance between base station 100 and communication terminal station 150. In other words, since a propagation delay increases as the distance between base station 100 and communication terminal station 150 increases, the duration of the guard interval is set to be large to prevent collisions of bursts when the distance between base station 100 and communication terminal station 150 is large.

The rounding in TA control amount rounding section 107 will be described below. In the specification, the rounding is processing for deleting digits to the right of the predetermined significant digits in order to express target data by the predetermined number of significant digits. Further, an amount deleted in the rounding in the target data is referred to as a rounding error amount, and therefore, such an amount is expressed by digits lower than the predetermined number of significant digits.

As described previously, TA control amount rounding 107 performs the rounding on the TA control amount calculated in the TA control amount calculating section. The rounding-processed TA control amount is expressed by the predetermined number of significant digits, and is smaller in information amount than the TA control amount prior to the rounding by the rounding error amount. Accordingly, by transmitting the TA control amount of the number of significant digits decreased in the rounding to communication terminal station 150, since it is possible to increase a ratio of the information transmission channel to the communication channel, data transmission efficiency can be improved than transmitting the calculated TA control amount given no processing to communication terminal station 150. Meanwhile, by increasing the number of significant digits of the rounding-processed TA control amount, (in other words, by decreasing the number of digits deleted in the rounding), it is possible to broadcast the TA control amount with higher accuracy to communication terminal station 150, whereby the accuracy in time alignment control is improved as the number of significant digits is increased. As the accuracy in time alignment control is higher, it is possible to decrease the guard time (see FIG. 2) provided between bursts (channels). Therefore, as the number of significant digits is increased in the rounding, it is possible to use a frame more efficiently.

In this embodiment, the number of significant digits in the rounding in TA control amount rounding section 107 is determined in consideration of the data transmission efficiency desired in the system and the frame utility efficiency also desired in the system. Thus, it is possible to implement the transmission efficiency and frame utility efficiency preferable in the system.

As described above, base station 100 according to this embodiment broadcasts the rounding-processed TA control amount obtained in TA control amount rounding section 107 to communication terminal station 150, whereby it is possible to improve the frame utility efficiency as compared to the case of not performing the rounding. Further, since base station 100 corrects the reception timing in reception timing correcting section 109 using a rounding error amount of the TA control amount, it is possible to generate the reception timing with accuracy equal to that in the case of broadcasting a calculated TA control amount not subjected to the rounding to communication terminal station 150.

In other words, base station 100 according to this embodiment broadcasts the rounding-processed time alignment control amount to communication terminal station 150 so as to control the transmission timing in communication terminal station 150, while correcting the reception timing in the base station using the rounding error amount in the rounding, and thereby is capable of enhancing the data transmission efficiency without degrading the accuracy in reception timing generation.

Further, in this embodiment, it is possible to implement transmission efficiency and frame utility efficiency suitable for the system, by setting the number of significant digits in rounding at the proper number of digits.

In addition, while the aforementioned first embodiment explains the case of applying the present invention to a TDMA communication system, the present invention is not limited to such a case. For example, the present invention is applicable widely to other communication systems such as, for example, CDMA/TDD (Code Division Multiple Access/Time Division Duplex) communication system, in controlling transmission timing.

SECOND EMBODIMENT

Figure 3:
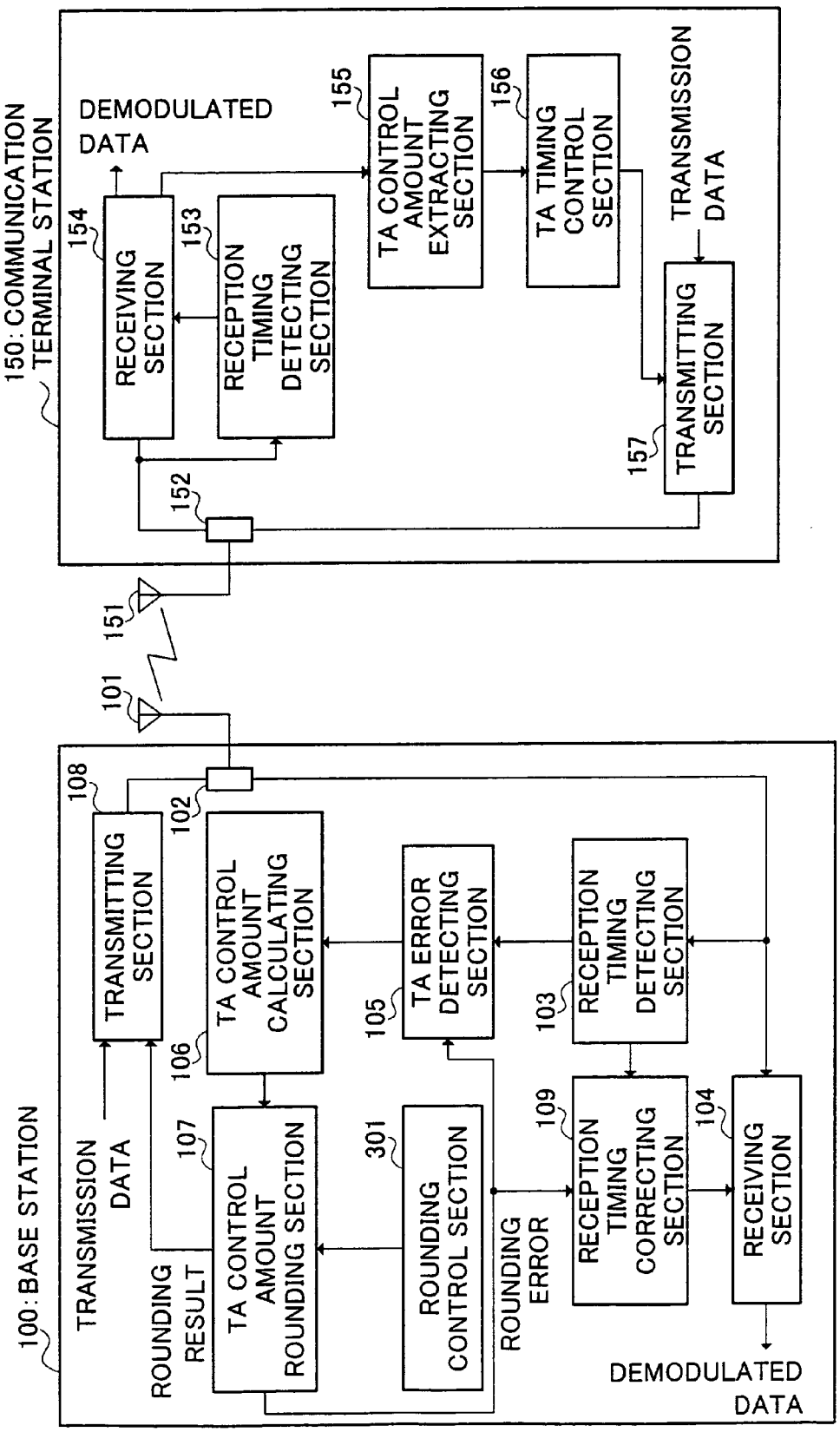
FIG. 3 is a diagram illustrating a configuration of a TDMA communication system according to a second embodiment of the present invention.

This embodiment is a modification of the first embodiment, and differs from the first embodiment in making the number of significant digits in rounding variable. FIG. 3 is a diagram illustrating a TDMA communication system according to the second embodiment of the present invention. In addition, in FIG. 3 the same sections as in FIG. 1 are assigned the same reference numerals to omit specific descriptions thereof.

In FIG. 3, rounding control section 301 adaptably controls the number of significant digits in the rounding performed in TA control amount rounding section 107. As in the first embodiment, the control of the number of significant digits is determined in consideration of relationships between the number of significant digits and data transmission efficiency, and between the number of significant digits and frame utility efficiency. For example, when specifications in the system are changed, rounding control section 301 sets the number of significant digits at the most suitable one for the system with the changed specifications, and thus it is possible to implement the transmission efficiency and frame utility efficiency suitable for the system with the change even when any change occurs in the system.

As described above, in base station 100 according to this embodiment, since rounding control section 301 controls the number of significant digits in rounding to be variable, it is possible to perform rounding suitable for the system readily. Particularly, when specifications of the system are changed, by setting the number of significant digits suitable for the changed specification, it is possible to implement the transmission efficiency and frame utility efficiency suitable for the system with the change even when there is any change in the system.

As is apparent to those skilled in the art, the present invention is capable of being carried into practice using a commercially available general digital computer and microprocessor with an incorporated program for operating techniques as described in aforementioned embodiments. Further, as is apparent to those skilled in the art, the present invention includes computer programs created by those skilled in the art based on the techniques as described in the embodiments.

Moreover, the present invention includes in its scope computer program produces that are computer readable storage media in which programs for operating the techniques as described in the embodiments are stored. The storage media include disks such as a flexible disk, optical disk, CDROM and magnetic disk, ROM (Read Only Memory), RAM (Random Access Memory), EPROM (Erasable Programmable Read-Only Memory), EEPROM (Electrically Erasable Programmable Read-Only Memory), magnetic optical card, memory card and DVD (Digital Versatile Disc), but are not limited to the foregoing.

In addition, the present invention is not limited to the aforementioned embodiments. For example, the present invention is capable of being carried into practice in a combination of the embodiments as appropriate.

As described above, according to the present invention, by correcting the reception timing using a rounding error amount in time alignment control amount, it is possible for an apparatus of the invention to adjust timing corresponding to a rounding error amount in the apparatus, without broadcasting a time alignment control amount corresponding to the rounding error amount, whereby it is possible to enhance the data transmission efficiency without degrading the accuracy in reception timing generation.

In addition, while the aforementioned second embodiment explains the case of applying the present invention to a TDMA communication system, the present invention is not limited to such a case. For example, the present invention is applicable widely to other communication systems such as CDMA/TDD (Code Division Multiple Access/Time Division Duplex) communication system, in controlling transmission timing.

A data transmission apparatus of the present invention has a configuration provided with a calculating section that calculates a time alignment control amount for controlling transmission timing in a communicating party apparatus, based on a signal received from the communicating party apparatus, a rounding section that performs rounding on the time alignment control amount to obtain a time aliment control amount of the predetermined number of significant digits and a rounding error amount, a detecting section which receives a signal transmitted at transmission timing corresponding to a rounding-processed time alignment control amount from the communicating party apparatus, and based on the signal received, detecting reception timing, a correcting section that corrects the reception timing detected in the detecting section, using the rounding error amount obtained in the rounding, and a receiving section that obtains demodulated data from a received signal at reception timing corrected in the correcting section.

According to this configuration, by correcting the reception timing using a rounding error amount in time alignment control amount, it is possible for the apparatus (data transmission apparatus) to adjust timing corresponding to the rounding error amount in the apparatus, without broadcasting to another apparatus on transmitting side a time alignment control amount corresponding to the rounding error amount. Accordingly, the data transmission apparatus is capable of enhancing the data transmission efficiency without degrading the accuracy in reception timing generation.

A data transmission apparatus of the present invention has a configuration where the number of significant digits in the rounding in the rounding section is made variable in the configuration of the above data transmission apparatus.

According to this configuration, since the number of significant digits in rounding is made variable, it is possible to perform rounding suitable for the system readily. Particularly, when specifications of the system are changed, by setting the number of significant digits suitable for the changed specification, it is possible to implement the transmission efficiency and frame utility efficiency suitable for the system with the change even when there is any change in the system.

A base station apparatus of the present invention has a configuration provided with the above-mentioned data transmission apparatus.

According to this configuration, it is possible in the system to enhance data transmission efficiency without degrading the accuracy in reception timing generation.

A base station apparatus of the present invention in the above-mentioned base station apparatus has a configuration where the rounding section determines the number of significant digits in the rounding corresponding to a radius of a cell of the base station apparatus.

According to this configuration, even when the radius of the cell is changed, it is possible to implement the transmission efficiency and frame utility efficiency suitable for the changed system.

A data transmission program of the present invention has a structure for making a computer function as a calculating section that calculates a time alignment control amount based on a received signal, a rounding section that performs rounding on the time alignment control amount, a correcting section that corrects reception timing using a rounding error amount obtained in the rounding, and a receiving section that obtains demodulated data from the received signal at reception timing corrected in the correcting section.

According to this structure, it is possible for an apparatus to adjust timing corresponding to a rounding error amount in the apparatus, without broadcasting to another apparatus on transmitting side a time alignment control amount corresponding to the rounding error amount, whereby it is possible to enhance the data transmission efficiency without degrading the accuracy in reception timing generation.

A data transmission method of the present invention has a step of calculating a time alignment control amount based on a received signal, a rounding step of performing rounding on the time alignment control amount, a correcting step of correcting reception timing using a rounding error amount obtained in the rounding, and a receiving step of obtaining demodulated data from the received signal at reception timing corrected in the correcting step.

According to the method, it is possible for an apparatus to adjust timing corresponding to a rounding error amount in the apparatus, without broadcasting to another apparatus on transmitting side a time alignment control amount corresponding to the rounding error amount, whereby it is possible to enhance the data transmission efficiency without degrading the accuracy in reception timing generation.

This application is based on the Japanese Patent Application No.2001-218717 filed on Jul. 18, 2001, entire content of which is expressly incorporated by reference herein.

INDUSTRIAL APPLICABILITY

The present invention is suitable for use in a base station apparatus in a TDMA communication system, for example.

The invention claimed is:

1. A data transmission apparatus comprising:
   a calculating section that calculates a time alignment control amount for controlling transmission timing in a communicating party apparatus, based on a signal received from the communicating party apparatus;
   a rounding section that performs rounding on the time alignment control amount to obtain a time alignment control amount of a predetermined number of significant digits and a rounding error amount;
   a detecting section which receives, from the communicating party apparatus, a signal transmitted at transmission timing corresponding to a rounding-processed time alignment control amount and detects reception timing based on the signal received;
   a correcting section that corrects the reception timing detected in the detecting section, using the rounding error amount obtained in the rounding; and
   a receiving section that obtains demodulate data from a received signal at the reception timing corrected in the correcting section.

2. The data transmission apparatus according to claim 1, wherein the number of significant digits in the rounding in the rounding section is made variable.

3. A base station apparatus comprising the data transmission apparatus according to claim 2.

4. The base station apparatus according to claim 3, wherein the rounding section determines the number of significant digits in the rounding corresponding to a radius of a cell of the base station apparatus.

5. A base station apparatus comprising the data transmission apparatus according to claim 1.

6. The base station apparatus according to claim 5, wherein the rounding section determines the number of significant digits in the rounding corresponding to a radius of a cell of the base station apparatus.

7. A data transmission program recorded on a computer readable medium and executable by a computer, the program making the computer perform a process comprising:
   calculating a time alignment control amount based on a received signal;
   rounding the time alignment control amount;
   correcting reception timing using a rounding error amount obtained in the rounding; and
   receiving demodulated data from the received signal at the reception timing corrected in the correcting.

8. A data transmission method comprising:
   calculating a time alignment control amount based on a received signal at a data transmission apparatus;
   rounding the time alignment control amount at the data transmission apparatus;
   correcting reception timing at the data transmission apparatus using a rounding error amount obtained in the rounding; and
   receiving demodulated data from the received signal at the reception timing corrected in the correcting step at the data transmission apparatus.

* * * * *